(12) United States Patent
Sarangdhar et al.

(10) Patent No.: US 10,146,962 B2
(45) Date of Patent: Dec. 4, 2018

(54) METHOD AND APPARATUS FOR PROTECTING A PCI DEVICE CONTROLLER FROM MASQUERADE ATTACKS BY MALWARE

(71) Applicant: McAfee, LLC, Santa Clara, CA (US)

(72) Inventors: Nitin Sarangdhar, Portland, OR (US); Jonathan Edwards, Portland, OR (US); Scott Robinson, Portland, OR (US); Karanvir Grewal, Hillsboro, OR (US)

(73) Assignee: McAfee, LLC, Santa Clara, CA (US)

( * ) Notice: Subject to any disclaimer, the term of this patent is extended or adjusted under 35 U.S.C. 154(b) by 352 days.

(21) Appl. No.: 14/973,271

(22) Filed: Dec. 17, 2015

(65) Prior Publication Data

US 2017/0177909 A1 Jun. 22, 2017

(51) Int. Cl.
| | | |
|---|---|---|
| G06F 9/00 | (2006.01) | |
| G06F 21/85 | (2013.01) | |
| G06F 9/4401 | (2018.01) | |
| G06F 9/455 | (2018.01) | |
| G06F 12/1081 | (2016.01) | |
| G06F 13/28 | (2006.01) | |
| G06F 13/40 | (2006.01) | |
| G06F 13/42 | (2006.01) | |
| G06F 21/53 | (2013.01) | |
| G06F 21/57 | (2013.01) | |

(52) U.S. Cl.
CPC ............ *G06F 21/85* (2013.01); *G06F 9/4401* (2013.01); *G06F 9/45558* (2013.01); *G06F 12/1081* (2013.01); *G06F 13/28* (2013.01); *G06F 13/404* (2013.01); *G06F 13/4282* (2013.01); *G06F 21/53* (2013.01); *G06F 21/575* (2013.01); *G06F 2009/45587* (2013.01); *G06F 2212/656* (2013.01); *G06F 2213/0024* (2013.01); *G06F 2213/2806* (2013.01); *G06F 2221/2149* (2013.01)

(58) Field of Classification Search
CPC ........... G06F 21/575; G06F 2213/0024; G06F 9/45558
See application file for complete search history.

(56) References Cited

U.S. PATENT DOCUMENTS

| | | |
|---|---|---|
| 8,387,046 B1 | 2/2013 | Montague et al. |
| 2003/0172214 A1 | 9/2003 | Moyer et al. |

(Continued)

OTHER PUBLICATIONS

International Searching Authority, "International Search Report and Written Opinion," issued in connection with International Application No. PCT/US2016/053879, dated Jan. 10, 2017, 14 pages.

(Continued)

*Primary Examiner* — Zachary K Huson
(74) *Attorney, Agent, or Firm* — Hanley, Flight & Zimmerman, LLC

(57) ABSTRACT

A technique allows for protecting a PCI device controller from a PCI BDF masquerade attack from Ring-0 and Ring-3 malware. The technique may use Virtualization technologies to create guest virtual machines that can use a hypervisor to allocate ACPI information from ACPI tables to a secure VM and using extended page tables (EPT) and VT-d policies to protect the MMIO memory range during illegal runtime events.

25 Claims, 6 Drawing Sheets

(56) References Cited

U.S. PATENT DOCUMENTS

| | | | |
|---|---|---|---|
| 2005/0223220 A1 | 10/2005 | Campbell et al. | |
| 2006/0184785 A1 | 8/2006 | Challener et al. | |
| 2011/0107331 A1* | 5/2011 | Evans | H04W 4/003 718/1 |
| 2011/0141124 A1 | 6/2011 | Halls et al. | |
| 2015/0039891 A1* | 2/2015 | Ignatchenko | G06F 21/575 713/171 |
| 2015/0143362 A1* | 5/2015 | Lukacs | G06F 9/45558 718/1 |
| 2016/0283425 A1* | 9/2016 | Sarangdhar | G06F 13/362 |

OTHER PUBLICATIONS

International Bureau, "International Preliminary Report on Patentability," issued in connection with International Application No. PCT/US2016/053879, dated Jun. 19, 2018, 10 pages.

\* cited by examiner

METHOD AND APPARATUS FOR PROTECTING A PCI DEVICE CONTROLLER FROM MASQUERADE ATTACKS BY MALWARE

TECHNICAL FIELD

Embodiments described herein generally relate to computer security and protection from malware and, more particularly, to techniques for configuring a Peripheral Component Interconnect ("PCI") device to protect the PCI device from masquerade attacks by Ring-0 and Ring-3 resident malware in the primary OS.

BACKGROUND ART

Today, sensors in user computing devices (or user device) are used to capture data for making decisions and/or taking actions with respect to the data. These sensors can include human-interface devices such as, for example, keyboards, microphones, and video cameras that are connected to a PCI bus based controller on the user device, either directly through a physical connection or indirectly through wireless interfaces. Each sensor can be connected to a PCI peripheral device controller, for example a PCI Express (PCIe) based controller or a legacy PCI based controller that must be configured through a process called PCI enumeration before it can be used by the user device.

When a computing device first powers up, a number of internal or external sensors are initialized or configured prior to loading the computer's operating system (OS). Sensors can be connected to the PCI peripheral device controller through USB, Camera Serial Interfaces, or other interfaces. Each sensor is configured through a process called sensor enumeration that receives commands from the peripheral device controller to which they are connected. Prior to sensor enumeration, peripheral device controller initialization is performed via PCI Bus enumeration by the Basic Input Output System (BIOS) during boot-up. The BIOS follows PCI enumeration to read capabilities exposed by the peripheral device controller at a specific Bus, Device, and Function location (commonly referred to as BDF location). Each peripheral device controller has a set of registers that is referred to as a configuration space, which is addressable through the BDF location. The BDF is a numerical triplet that identifies a peripheral device controller and its location on the bus. PCI Configuration space allows the B value (of the BDF) to be programmable by BIOS or operating system. Since the BDF serves as the basis of security framework with the VTd engine, it is necessary to lock down the BDF value of a PCI Controller such that it remains unchanged during runtime. It is also necessary to ensure that no other PCI Controller is allowed to masquerade itself with the BDF value of the controllers of interest.

Upon retrieving the configuration space from the peripheral device controller, the BIOS or operating system will configure the peripheral device controller to be accessible from a set of memory-mapped address range. This region is generally referred to as MMIO region. Through enumeration, address registers in the peripheral device controller's configuration space are mapped to the computer system's memory-mapped address spaces for PCI based Peripheral device controllers. These MMIO addresses stay valid as long as the computer system is powered on or until operating system chooses to rebalance the MMIO address range. The BIOS may initialize the MMIO address space corresponding to a specific BDF location PCI configuration space. The operating system (OS) may obtain this information by repeating the PCI enumeration and simply reading the PCI configuration space. Reads and writes to the peripheral device controller can be initiated from the processor via or by the memory-mapped address region (MMIO). Thus, for a given BDF, the peripheral device controller will be mapped to a particular address range in physical memory The memory mapped region for the peripheral device controller may be altered by the operating system for rebalancing the MMIO space. In order to support this requirement the PCI configuration space of the peripheral device controller is available to RING-0 based OS software.

However, the memory mapped region for the peripheral device controller may also be vulnerable to malware. For example, these peripheral device controllers may be subject to Ring-0 malware attacks that can access those MMIO address ranges for reconfiguring the address locations and compromising security of the data that may be received from the sensor connected to the peripheral device controller.

Specifically some peripheral device controllers return data to the computing system software using DMA techniques wherein data read from the sensor is directly DMAed to the memory. In order to route the DMA data to a specific memory region VTd HW is available inside the processing system. The VTd HW is programmed with VTd page table per bus device function location.

A privileged peripheral device controller such as one connected to a biometric authentication sensor may be allowed to perform DMA operations to a privileged memory region through the VTd HW programming. Such DMA operations may including reading input data using DMA from a privileged memory region and returning output data to using DMA to a privileged memory location.

However if the BDF value or the MMIO space of the peripheral device controller can be compromised such that it performs DMA read data operations from an area of memory that can be accessed by malware then the image can be captured by malware. This is known as the data capture attack.

Similarly if the BDF value or the MMIO space of the peripheral device controller can be compromised such that it performs DMA write operations to privileged memory region after receiving data from compromised memory region, it is possible to create a data injection attack.

PCI Controller specification also allow peer-to-peer DMA transactions. One such example is DMA write data from the PCI controller supporting secure sensor data may be DMAed to a peer PCI Controller, which supports a storage device. Such transfer would violate the privacy requirement associated with the sensor data. Such capability may be enabled or disabled using Access Control Services in the PCI configuration space.

However, there are no current techniques for protecting BDF values, memory address ranges and access control services from access by resident Ring-0 and Ring-3 malware, while allowing a legitimate RING-0 software to perform legitimate accesses to the same address range. A technique for protecting data received from a sensor from Ring-0 and Ring-3 resident malware would be desirable.

DESCRIPTION OF EMBODIMENTS

Figure 1:
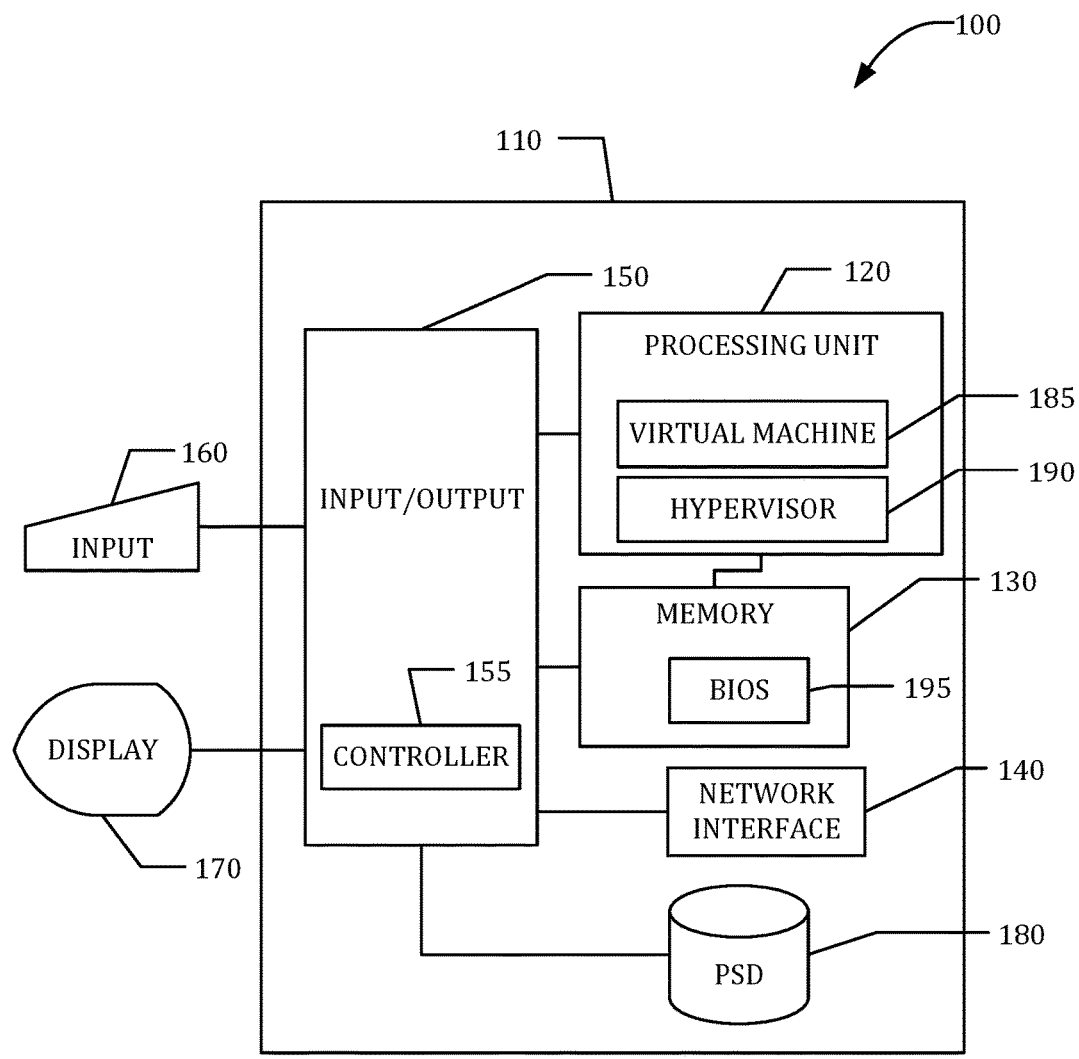
FIG. 1 is a block diagram illustrating a computer system upon which an embodiment of the invention may be implemented.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a programmable device" can refer to a single programmable device or a plurality of programmable devices working together to perform the function described as being performed on or by a programmable device. Similarly, "a machine-readable medium" can refer to a single physical medium or a plurality of media that together may store the material described as being stored on the machine-readable medium.

As used herein, the term "malware" can refer to any software used to disrupt operation of a programmable device, gather sensitive information or gain access to private systems or networks. Malware includes computer viruses (including worms, Trojan horses, etc.), Bots, ransomware, spyware, adware, scareware, software exploits and any other type of malicious programs or code.

As used herein, the term "ACPI" can refer to Advanced Configuration and Power Interface that an OS can use for computer hardware discovery, configuration, power management, and monitoring. ACPI tables are used by the OS for configuration during boot and can include other information including number of CPUs, programmable interrupt controller details, memory ranges, etc.

As used herein, the term "Virtualization Technology (VT)" can refer to a set of hardware enhancements to a computing platform that allows the computing platform to run multiple operating systems and applications in independent partitions (or multiple instances of the same operating system) on a single computer system. VT allows one computer system to function as multiple virtual computing systems.

As used herein, the term "hypervisor" or a "Virtual Machine Monitor (VMM)" is a software program that manages multiple virtual operating systems. The hypervisor manages the system's processor, memory, and other resources to allocate what each virtual operating system requires.

As used herein, the term "VT-d" can refer to virtualization technology for directed I/O that uses hardware support for isolating and restricting access to the I/O device to a virtual machine (VM) managing the I/O device. VT-d supports re-mapping of direct memory access (DMA) transfers and device-generated interrupts, which helps to improve isolation of I/O devices and to assign directly an I/O resource to a specific VM. Thus, an unmodified guest OS can obtain direct access to that resource, without requiring the VMM to provide emulated device drivers for it. Moreover, if an I/O device has been assigned to particular VMs, that device is not accessible by other VMs, nor are the other VMs accessible by the device.

As used herein, the term "IOMMU" can refer to an I/O memory management unit (IOMMU) hardware that maintains a record of which physical memory regions are mapped to which I/O devices, allowing it to control access to those memory locations based on which I/O device requests the access.

As used herein, the term "Extended Page Table Virtualization" (EPT Virtualization) can refer to a hardware assist to memory virtualization, which includes mapping within the hypervisor between the physical memory and the page tables in the guest OSs. A guest OS stores the mapping between virtual and physical memory addresses in page tables while the hypervisor stores the mapping between physical memory addresses to machine page addresses in hardware.

As used herein "Access Control Services" (ACS) can refer to a hardware configuration support to manage policies associated with peer-to-peer DMA services.

A technique allows for protecting a PCI device controller from a PCI BDF masquerade attack from Ring-0 and Ring-3 malware. In the context of a hierarchical protection domain model using protection rings, wherein a lower number represents a higher priority, operating system kernels may operate at Ring-0 while drivers and some applications may operate at Ring-0 or Ring-3. Embodiments described herein may use virtualization technologies to create guest virtual machines that can use a hypervisor to allocate ACPI information from configuration and interface tables, for example, ACPI tables to a Secure VM and use extended page tables (EPT) and VT-d policies to protect the BDF, MMIO memory range and access control services memory range during runtime events. An embodiment described herein includes enumerating an address space associated with a peripheral device through the BDF that can be accessed through legacy PIO or PCI based MMIO. Ensuring that the newly enumerated BDF does not collide with an existing BDF value. Other embodiments include VT-d isolation to the peripheral device from unsecure guest operating systems (OS) using virtualization technologies to ensure that malware may not access the peripheral device data.

Referring to the figures, FIG. 1 illustrates an example computer system or client 100 in block diagram form for use in protecting a computer system from PCI controller masquerade attacks by Ring-0 and Ring-3 malware. Example system 100 of FIG. 1 includes a system unit 110 which may be optionally connected to a peripheral/input device 160 (e.g., camera, fingerprint sensor, keyboard, mouse, touch screen, etc.) and display 170. A program storage device (PSD) 180 can be included with the system unit 110. Also included with system unit 110 is a network interface 140 for communication via a network with other computing and corporate infrastructure devices (not shown). Network interface 140 may be included within system unit 110 or be external to system unit 110. In either case, system unit 110 may be communicatively coupled to network interface 140. Program storage device 180 represents any form of non-volatile storage including, but not limited to, all forms of optical and magnetic, including solid-state, storage elements, including removable media, and may be included within system unit 110 or be external to system unit 110. Program storage device 180 may be used for storage of software to control system unit 110, data for use by the system 100, or both.

Figure 2:
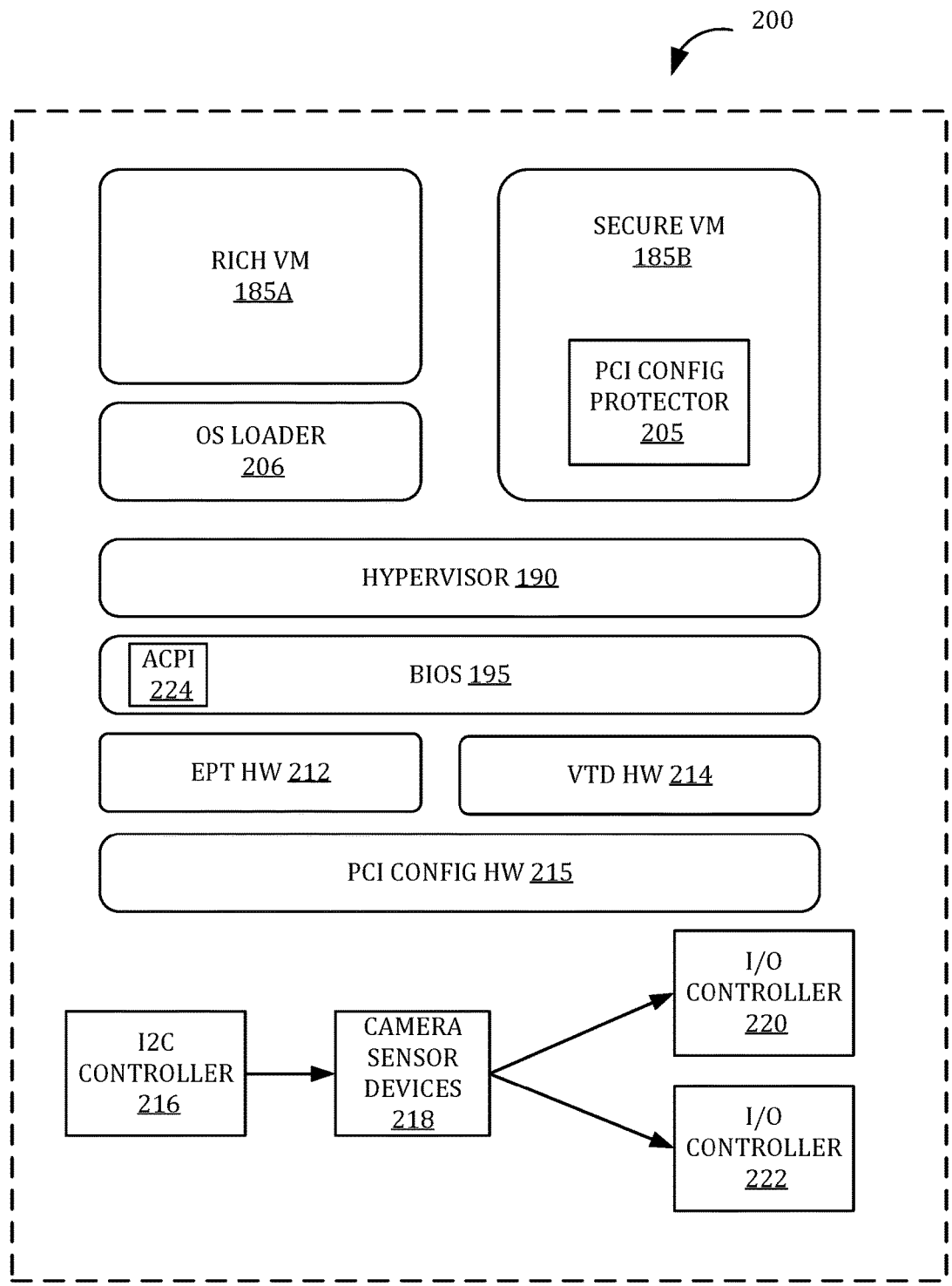
FIG. 2 is a block diagram illustrating an architecture upon which an embodiment of the invention may be implemented.
Figure 3:
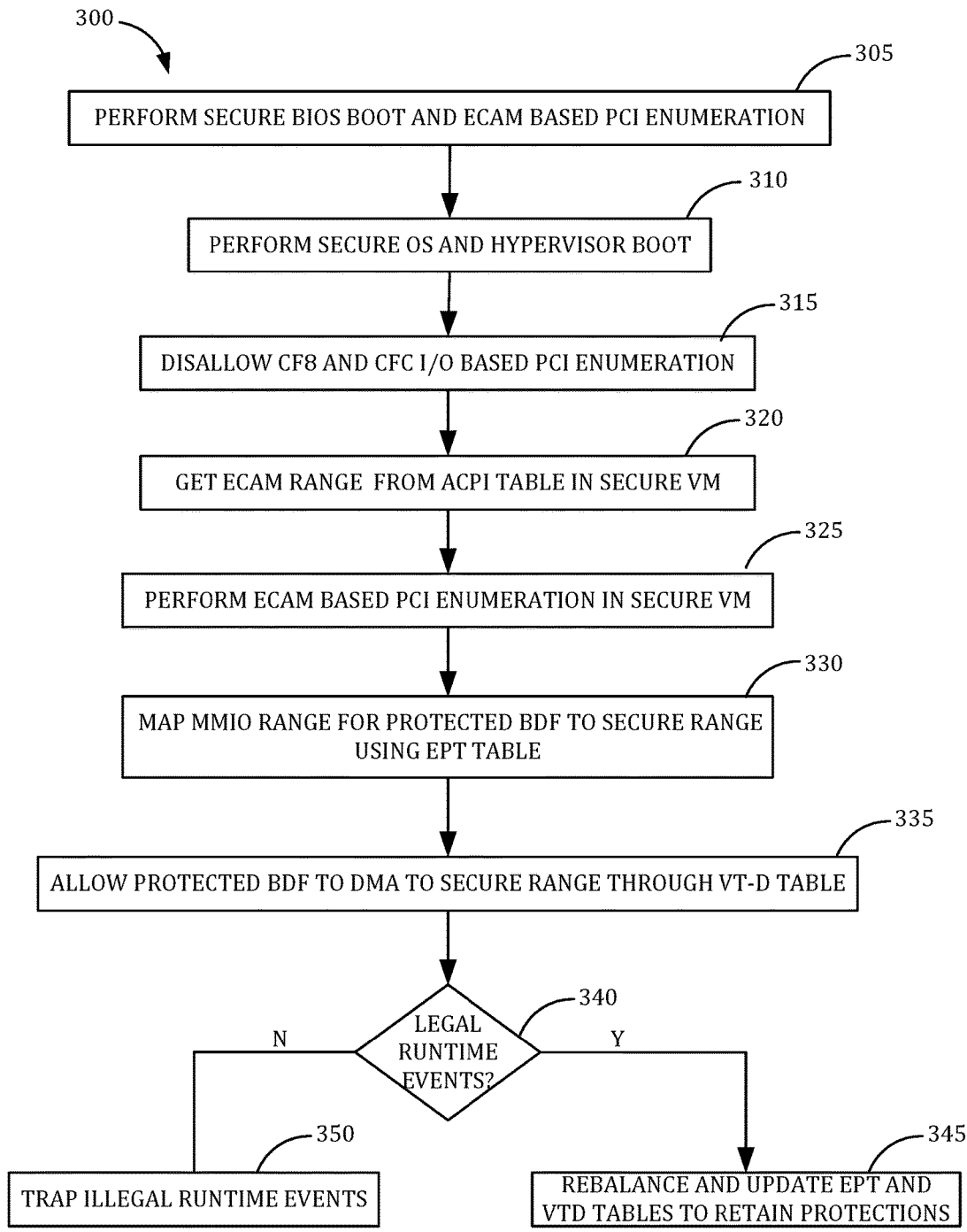
FIG. 3 is a dataflow diagram illustrating a technique for protecting a PCI controller from malware according to one embodiment.

System unit 110 may be programmed to perform techniques described herein (an example of which is in FIG. 3). System unit 110 comprises a processing unit (PU) 120, input-output (I/O) interface 150 and memory 130. Processing unit 120 may include any programmable controller device including, for example, one or more members of the Intel® Atom™ and Intel® Core™ processor families from Intel Corporation and the Cortex and ARM processor families from ARM. (INTEL, INTEL ATOM, and INTEL CORE are registered trademarks of Intel Corporation. CORTEX is a registered trademark of the ARM Limited Corporation. ARM is a registered trademark of the ARM Limited Company). In an example, processing unit 120 may run one or more virtual machines 185 (VM) that each have a guest operating system (OS) installed and allocated a guest memory address. One or more virtual machines 185 may include an unsecure VM 185A and a secure VM 185B, as is shown below in FIG. 2. Each of the VM's 185 may have access to host resources like memory 130, network interface 140 and PSD 180. The processing unit 120 may also run a hypervisor 190 (or Virtual Machine Monitor) that may be configured to create, run and manage the VM's 185 on system unit 110, as will be described below in FIGS. 2 and 3.

I/O interface 150 may include one or more I/O controllers 155 that is configured to connect peripheral devices such as human interface devices, for example, a camera, audio device, keyboard, or the like to an internal bus (not shown). The I/O controller 155 can include a legacy PIO controller, an ECAM based PCI-Express (PCIe) controller, a USB controller, a camera serial interface controller, a MIPI controller, or the like. I/O controllers 155 may be located within the I/O interface 150 (as shown) or alternatively, may be located outside the I/O interface 150. The I/O controller can be configured to communicate with the computer's bus using, for example, a USB, a PIO or a PCI Express architecture.

Memory 130 may include one or more memory modules and comprise random access memory (RAM), read only memory (ROM), programmable read only memory (PROM), programmable read-write memory, and solid-state memory. Memory 130 is configured to store executable instructions for BIOS 195 as well as instructions for protecting BDF addresses from Ring-0 and Ring-3 malware. For example, one or more computer readable storage media may be encoded with software comprising computer executable instructions and the software may be executed to perform process logic related to the operations of BIOS 195. Instructions for performing the process logic of BIOS 195 may be stored in the memory 130 for execution by processing unit 120. One of ordinary skill in the art will also recognize that processing unit 120 may also include some internal memory including, for example, cache memory. System 100 shown in FIG. 1 is a very simple representation and is meant to refer to any device that boots up using BIOS like techniques and can be applicable to various computing devices, e.g., personal computers (PCs), embedded devices, portable devices, network appliances, rack mount devices, as well as servers. Thus, the configuration shown in FIG. 1 is intended to only be an example for purposes for describing the techniques herein.

FIG. 2 is a schematic diagram of an embodiment of a computing architecture 200 that may be used for protecting a PCI controller from BDF attacks by Ring-0 and Ring-3 malware. Architecture 200 may be used with system or client 100 of FIG. 1 for implementing embodiments of the invention described herein.

With continued reference to FIG. 1, architecture 200 can include software components such as virtual machines (VM) 185A and 185B, OS loader 206, hypervisor 190 and BIOS 195. Each VM 185A and 185B may have a guest operating system (OS) and are considered to be guest VM's. Guest OS's may be implemented by OS loader 206 during enumeration. In an example, OS loader 206 may be configured to load an operating system from a storage device, for example, storage device 130 (FIG. 1) onto the separate VMs 185A, 185B so as to set up a virtual guest OS environment in each of the VMs 185A, 185B. Each of the VMs 185A, 185B may be configured to appear to have its own processor, memory, drivers, and/or other computing resources. In an embodiment, VM 185A may be configured as an unsecure VM while VM 185B may be configured as a Secure VM. The unsecure VM 185A environment may be generally considered to be a VM with an unsecure OS where device applications may be executed and can be accessible by other applications that may execute with the VM 185A. The unsecure VM 185A is therefore a Rich OS environment that is vulnerable to both software attacks. On the other hand, Secure VM 185B is generally considered to have a secure OS environment that provides a high-level of security and which optionally comprises tamper-resistant hardware within which secure applications and their confidential data is stored and executed. While two VMs 185A and 185B are shown, an embodiment of architecture 200 may also include additional such VM's.

The computing architecture 200 may also include a hypervisor 190, a BIOS 195, and hardware-assisted virtualization technologies such as EPT hardware 212, VT-d hardware 214 and PCI Configuration Space HW 215. Hypervisor 190 (or VMM) may be configured to create, run, and manage the VMs 185A, 185B on system 100 and can be configured to allocate processor, memory, and other computing resources for each VM 185A, 185B. Hypervisor 190 may also be configured to load the OS loader 206 that instantiates OSs onto VMs 185A, 185B. In one embodiment, hypervisor 190 may be further configured to protect memory address ranges for system 100 by managing hardware-assisted virtualization technologies using hardware such as EPT hardware 212 and VT-d hardware 214, as will be described below in relation to FIG. 3. In one embodiment, PCI Configuration Protector 205 may be a unique SW module running inside Secure VM 185B to ensure the protection of the values programmed in PCI Configuration Space HW 215.

BIOS 195 may be the BIOS 195 of system 100 and can be configured to ECAM based enumeration of camera sensor devices 218 through I/O controllers 220, 222. PCI device Enumeration may be performed using Enhanced Configuration Access Mechanism (ECAM) enumeration using, in an embodiment, a memory mapped address range to access the PCI device's configuration registers. During secure BIOS boot, the BIOS 195 may execute firmware in memory, for example, ROM memory on system 100 to identify connected PCI devices to retrieve the unique DF number (of the BDF) for the connected PCI device using pointers that identify where an ECAM range lies for the PCI device. During PCI enumeration BIOS may assign a unique B value (of the BDF) to indicate the bus address of the currently enumerated controller. During PCI enumeration, BIOS 195 may receive information related to memory that is needed by each PCI device controller. Identified memory may be used to program Base Address Registers (commonly referred to as "MMIO BARs") in the PCI device by writing configuration commands to the PCI controller and assigns memory addresses and memory ranges for the PCI device controller in physical memory to create the MMIO address ranges (or ECAM MMIO range) for the PCI controller. MMIO address ranges, BDF information, controller identifiers, and the like form enumerated information for the camera sensor devices 218 that may be populated in one or more ACPI tables 224, which is stored in the OS loader 206.

Architecture 200 can also include hardware devices such as, for example, I2C controller 216, sensor devices 218 and I/O controllers 220, 222. I2C controller 216 can be a peripheral device controller that is configured to connect lower speed peripheral integrated circuits and devices to an I2C serial bus. Sensor device 218 can be, for example a human-interface devices such as a camera that generates and communicates data to system 100 that is addressable through one or more I/O controllers 220, 222.

FIG. 3 depicts a dataflow diagram illustrating a technique 300 for protecting a PCI controller from malware according to one embodiment. Technique 300 may illustrate a method for enumerating a PCI device during BIOS boot or reboot as well as using hardware virtualization technologies with a hypervisor to protect communications between a PCI device controller, for example, controller 220 and a secure OS environment, for example, Secure VM 185B using VT-d and EPT policies.

With continued reference to FIGS. 1 and 2, technique 300 starts in 305 where a secure BIOS boot and PCI enumeration is performed. The BIOS, for example, BIOS 195 of system 100, may perform a secure BIOS boot for enumerating one or more connected PCI controllers during initial startup of a computer system 100 or during reboot of system 100. The BIOS would assign a unique "B" value in the PCI Configuration space HW 215 associated with the PCI controllers.

In 310, a secure OS and hypervisor boot is performed on system 100. In one embodiment, BIOS 195 launches or initializes a hypervisor 190 and executes an OS loader 206 during secure OS boot. The BIOS 195 verifies a signature of the hypervisor 190 that is to be initialized. After initialization, the hypervisor 190 may partition the memory space of the CPU into an unsecure VM 185A and a Secure VM 185B. The hypervisor 190 further verifies the signature of each OS that is to be loaded into VMs 185A, 185B. If verification of the OS signature is successful, the OS loader 206 executes instructions to load operating systems into each partitioned memory location of the Unsecure VM 185A and the Secure VM 185B. In another embodiment, during BIOS boot, the OS loader 206 is initially executed by BIOS 195. After initialization, OS loader 206 launches or executes the hypervisor 190. The hypervisor 190 may then continue with partitioning memory regions VM 185A, 185B in memory and loading representative OS's in VMs 185A, 185B, for example, an OS into Secure VM 185B before loading an OS into unsecure VM 185A.

In 315, legacy enumeration is disabled in BIOS 195 and Hypervisor 190. In one example, BIOS 195 and Hypervisor 190 may disallow memory read and writes to configuration address I/O port registers (0xCF8) and configuration data I/O port registers (0xCFC). Further, enumeration is performed by BIOS 195 using ECAM enumeration to retrieve, in some embodiments, BDF information and ECAM MMIO ranges (also known as "memory mapped address range") for the PCI device from a PCI device controller that is stored in one or more ACPI tables.

In 320, the secure VM 185B receives enumerated information including ECAM MMIO range and BDF value from one or more configuration and interface tables, for example, ACPI tables. In an example, the OS loader 206 retrieves the ECAM MMIO range and BDF value for the PCI controller from the ACPI tables and transmits the information to the Secure VM 185B. In an embodiment, the ECAM MMIO range and BDF value is retrieved as ACPI information from the ACPI tables that may be used by the Secure VM 185B to perform ECAM based PCI enumeration in the Secure VM 185B.

In 325, ECAM based PCI enumeration may be performed by the Secure VM 185B. In an embodiment, hypervisor 190 uses the ECAM MMIO range from the ACPI tables to associate the BDF values associated with the PCI controller that would in turn be used to identify and protect the MMIO address ranges by the Secure VM 185B using, in one example, extended page table (EPT) hardware virtualization.

In 330, hypervisor 190 may map MMIO range for a protected BDF to a secure range. For example, hypervisor 190 may prevent unsecure VM 185A from accessing MMIO for the PCI controller via the BDF by using, in one example, Extended Page Table (EPT) hardware virtualization. In EPT virtualization, VMs provide a mapping between virtual page numbers in each VM to physical page numbers in the VM. Hypervisor 190 may isolate unsecure VM 185A from MMIO address range access through the BDF by using the EPT to provide an additional layer of address translation that maps physical page numbers in the Secure VM 185B to machine page numbers in physical memory that is only accessible to the Secure VM 185B. Thus, the hypervisor 190, by using EPT, may isolate certain MMIO memory ranges from being accessed by unsecure VM 185A and may prevent unsecure VM 185A from accessing the machine page numbers for MMIO memory ranges and may only provide this MMIO memory access to Secure VM 185B.

In 335, hypervisor 190 may only allow Direct Memory Access (DMA) to the Secure VM 185B. For example, hypervisor 190 may disallow DMA from the PCI controller, for example, PCI controller 220 to the main memory of the unsecure VM 185A and only allow DMA to Secure VM 185B using VT-d hardware virtualization. The hypervisor 190 may enable a VT-d table to provide DMA access for PCI controller 220 to the Secure VM 185B and prevent access by the PCI controller 220 to the unsecure VM 185A. VT-d hardware virtualizations may be configured through VT-d tables using an I/O memory management unit (IOMMU). Also, a Secure VM 185B may be assigned to a VT-d table for a particular PCI controller, for example, PCI controller 220. PCI controller 220 has a unique BDF. Each BDF has a single VT-d table that stores memory address information for the PCI controller 220 and, PCI controller 220 may DMA to only a specific area of memory, which is managed through the VT-d table. Under VT-d, the I/O memory management unit (IOMMU) maintains a record of which physical memory regions are mapped to which I/O devices, allowing it to control access to those memory locations based on which I/O device requests the access.

In 340, system 100 may monitor changes to PCI Configuration space that carries programmable BDF values and Access Control Services and MMIO memory ranges for the PCI bar values and detect whether a legal runtime event has occurred on system 100 through an ECAM MMIO range trap. Legal runtime events can include, for example, a driver load and unload or a rebalancing of the MMIO memory region. A rebalancing may be a result of a change to the MMIO memory space from for example, 3 GB to 3.5 GB when an additional resource is added by system 100. An illegal runtime event can include read or writes to PIO registers (0xCFC and 0xCF8) or reprogramming B value in the PCI Configuration space or reprogramming access control register in the PCI Configuration space or the like from a Ring-0 malware. In 340, if a legal runtime event is detected (i.e., step 340="Y"), then, in 345, the MMIO range for the PCI controller may be rebalanced. During rebalancing of the MMIO address ranges, the MMIO protection area of 3 GB to 3.5 GB may move from the unsecure VM 185A to the Secure VM 185B and the EPT tables and VT-d tables may be rewritten to match the change in the MMIO protection. However, if an illegal runtime event is detected (i.e., step 340="N"), then in 350, the illegal runtime events are trapped and disallowed.

Benefits of the embodiments described herein include preventing malware during device enumerations and protecting PCI controller communications to a host system by preventing a potential threat to data from the PCI device from any kind of Ring-0 and Ring-3 malware that may try to access MMIO memory address ranges for the PCI controller, associated with the PCI device.

Figure 4:
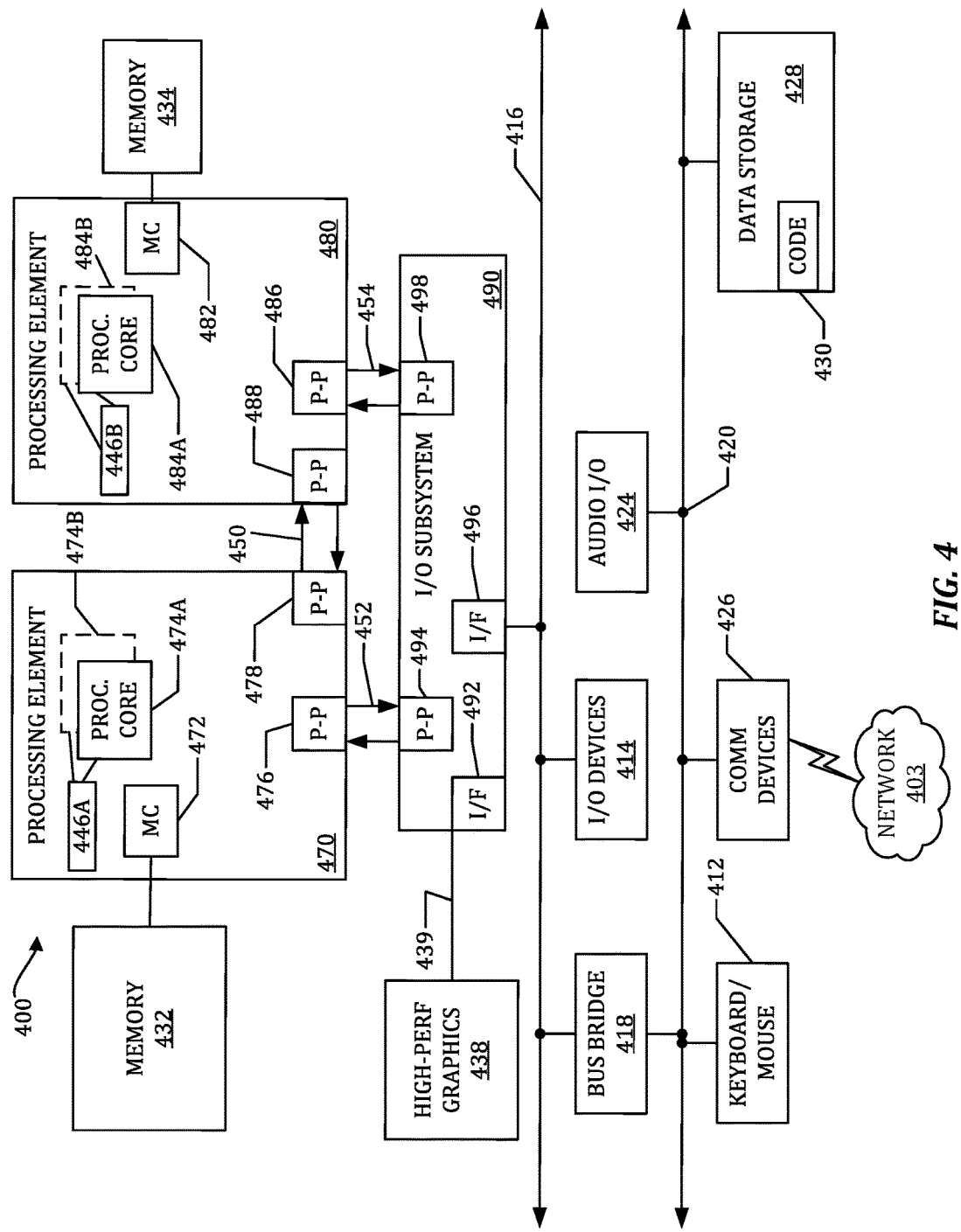
FIG. 4 is a diagram illustrating a computing device for use with techniques described herein according to one embodiment.

Referring now to FIG. 4, a block diagram illustrates a programmable device 400 that may be used with architecture 200 in accordance with one embodiment. The programmable device 400 illustrated in FIG. 4 is a multiprocessor programmable device that includes a first processing element 470 and a second processing element 480. While two processing elements 470 and 480 are shown, an embodiment of programmable device 400 may also include only one such processing element.

Programmable device 400 is illustrated as a point-to-point interconnect system, in which the first processing element 470 and second processing element 480 are coupled via a point-to-point interconnect 450. Any or all of the interconnects illustrated in FIG. 4 may be implemented as a multi-drop bus rather than point-to-point interconnects.

As illustrated in FIG. 4, each of processing elements 470 and 480 may be multicore processors, including first and second processor cores (i.e., processor cores 474a and 474b and processor cores 484a and 484b). Such cores 474a, 474b, 484a, 484b may be configured to execute instruction code in a manner similar to that discussed above in connection with FIGS. 1-3. However, other embodiments may use processing elements that are single core processors as desired. In embodiments with multiple processing elements 470, 480, each processing element may be implemented with different numbers of cores as desired.

Each processing element 470, 480 may include at least one shared cache 446. The shared cache 446a, 446b may store data (e.g., instructions) that are utilized by one or more components of the processing element, such as the cores 474a, 474b and 484a, 484b, respectively. For example, the shared cache may locally cache data stored in a memory 432, 434 for faster access by components of the processing elements 470, 480. In one or more embodiments, the shared cache 446a, 446b may include one or more mid-level caches, such as level 2 (L2), level 3 (L3), level 4 (L4), or other levels of cache, a last level cache (LLC), or combinations thereof.

While FIG. 4 illustrates a programmable device with two processing elements 470, 480 for clarity of the drawing, the scope of the present invention is not so limited and any number of processing elements may be present. Alternatively, one or more of processing elements 470, 480 may be an element other than a processor, such as an graphics processing unit (GPU), a digital signal processing (DSP) unit, a field programmable gate array, or any other programmable processing element. Processing element 480 may be heterogeneous or asymmetric to processing element 470. There may be a variety of differences between processing elements 470, 480 in terms of a spectrum of metrics of merit including architectural, microarchitectural, thermal, power consumption characteristics and the like. These differences may effectively manifest themselves as asymmetry and heterogeneity amongst processing elements 470, 480. In some embodiments, the various processing elements 470, 480 may reside in the same die package.

First processing element 470 may further include memory controller logic (MC) 472 and point-to-point (P-P) interconnects 476 and 478. Similarly, second processing element 480 may include a MC 482 and P-P interconnects 486 and 488. As illustrated in FIG. 4, MCs 472 and 482 couple processing elements 470, 480 to respective memories, namely a memory 432 and a memory 434, which may be portions of main memory locally attached to the respective processors. While MC logic 472 and 482 is illustrated as integrated into processing elements 470, 480, in some embodiments the memory controller logic may be discrete logic outside processing elements 470, 480 rather than integrated therein.

Processing element 470 and processing element 480 may be coupled to an I/O subsystem 490 via respective P-P interconnects 476 and 486 through links 452 and 454. As illustrated in FIG. 4, I/O subsystem 490 includes P-P interconnects 494 and 498. Furthermore, I/O subsystem 490 includes an interface 492 to couple I/O subsystem 490 with a high performance graphics engine 438. In one embodiment, a bus (not shown) may be used to couple graphics engine 438 to I/O subsystem 490. Alternately, a point-to-point interconnect 439 may couple these components.

In turn, I/O subsystem 490 may be coupled to a first link 416 via an interface 496. In one embodiment, first link 416 may be a Peripheral Component Interconnect (PCI) bus, or a bus such as a PCI Express bus or another I/O interconnect bus, although the scope of the present invention is not so limited.

As illustrated in FIG. 4, various I/O devices 414, 424 may be coupled to first link 416, along with a bridge 418, which may couple first link 416 to a second link 420. In one embodiment, second link 420 may be a low pin count (LPC) bus. Various devices may be coupled to second link 420 including, for example, a keyboard/mouse 412, communication device(s) 426 (which may in turn be in communication with the computer network 403), and a data storage unit 428 such as a disk drive or other mass storage device which may include code 430, in one embodiment. The code 430 may include instructions for performing embodiments of one or more of the techniques described above. Further, an audio I/O 424 may be coupled to second link 420.

Note that other embodiments are contemplated. For example, instead of the point-to-point architecture of FIG. 4, a system may implement a multi-drop bus or another such communication topology. Although links 416 and 420 are illustrated as busses in FIG. 4, any desired type of link may be used. Also, the elements of FIG. 4 may alternatively be partitioned using more or fewer integrated chips than illustrated in FIG. 4.

Figure 5:
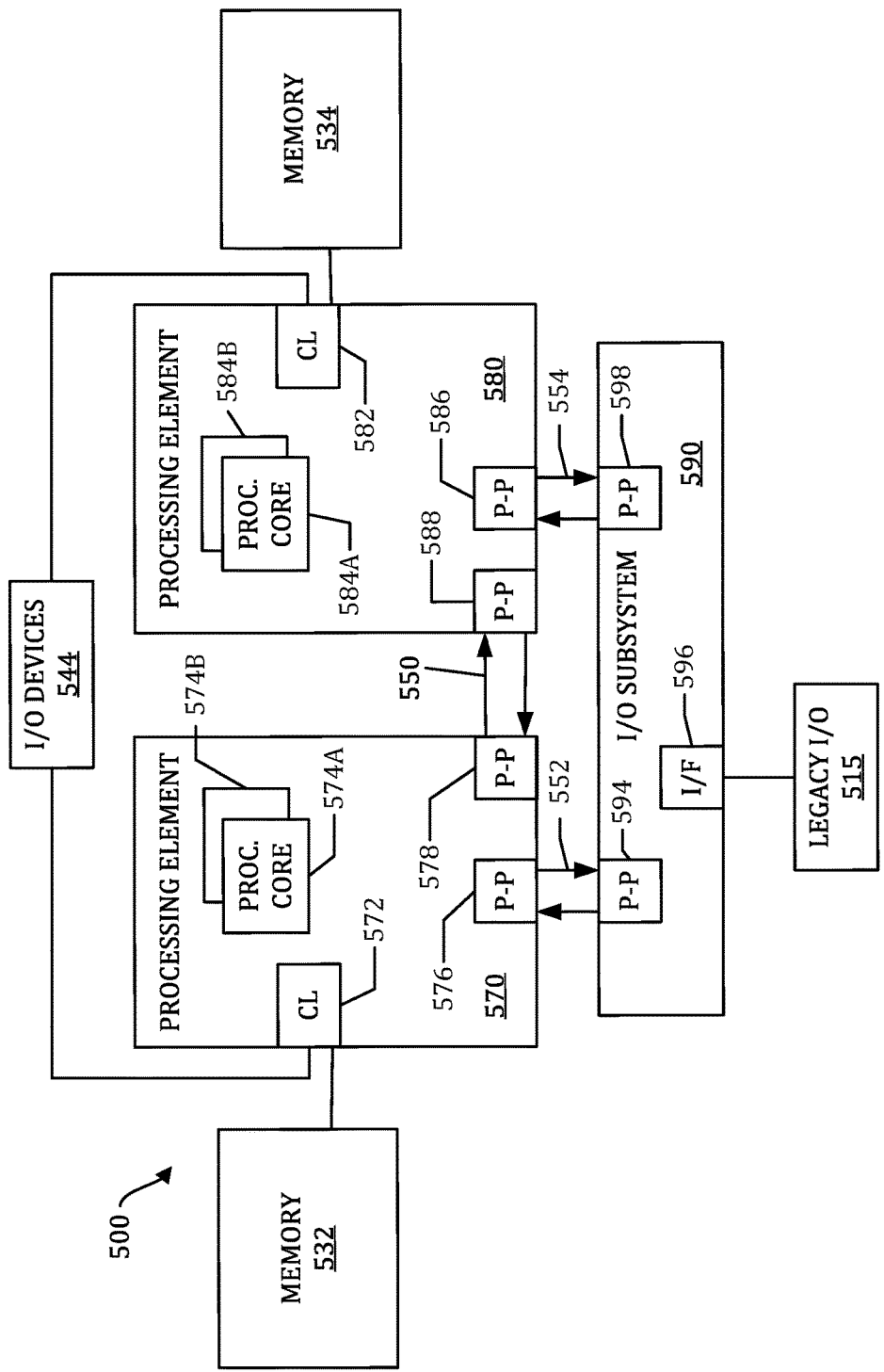
FIG. 5 is a block diagram illustrating a computing device for use with techniques described herein according to another embodiment.

Referring now to FIG. 5, a block diagram illustrates a programmable device 500 according to another embodiment. Certain aspects of FIG. 4 have been omitted from FIG. 5 in order to avoid obscuring other aspects of FIG. 5.

FIG. 5 illustrates that processing elements 570, 580 may include integrated memory and I/O control logic ("CL") 572 and 582, respectively. In some embodiments, the 572, 582 may include memory control logic (MC) such as that described above in connection with FIG. 5. In addition, CL 572, 582 may also include I/O control logic. FIG. 5 illustrates that not only may the memories 532, 534 be coupled to the 572, 582, but also that I/O devices 544 may also be coupled to the control logic 572, 582. Legacy I/O devices 515 may be coupled to the I/O subsystem 590 by interface 596. Each processing element 570, 580 may include multiple processor cores, illustrated in FIG. 5 as processor cores 574A, 574B, 584A and 584B. As illustrated in FIG. 5, I/O subsystem 590 includes point-to-point (P-P) interconnects 594 and 598 that connect to P-P interconnects 576 and 586 of the processing elements 570 and 580 with links 552 and 554. Processing elements 570 and 580 may also be interconnected by link 550 and interconnects 578 and 588, respectively.

The programmable devices depicted in FIGS. 4 and 5 are schematic illustrations of embodiments of programmable devices, which may be utilized to implement various embodiments discussed herein. Various components of the programmable devices depicted in FIGS. 4 and 5 may be combined in a system-on-a-chip (SoC) architecture.

Figure 6:
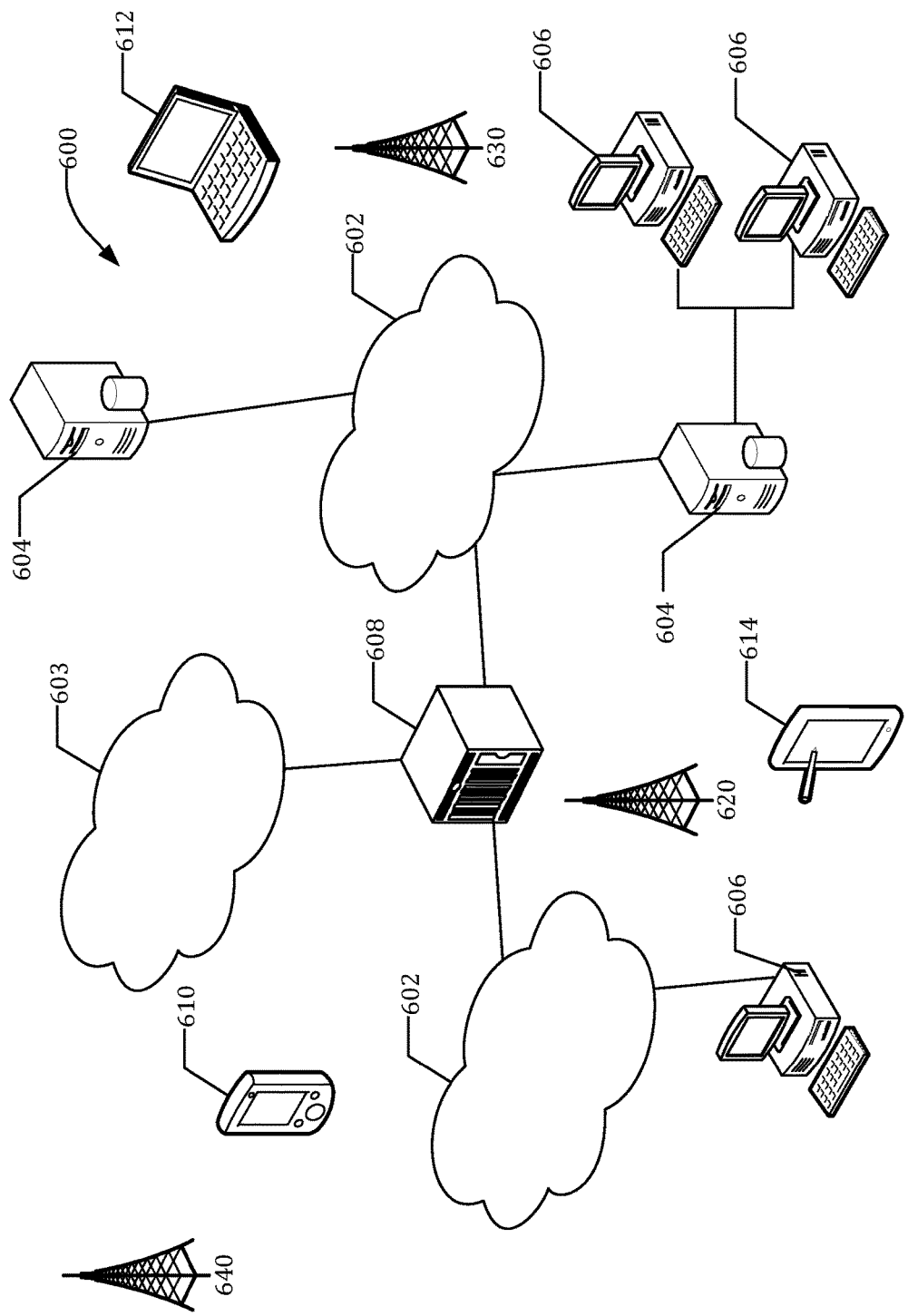
FIG. 6 is a diagram illustrating a network of programmable devices according to one embodiment.

FIG. 6 illustrates an example infrastructure 600 in which the techniques described herein may be implemented is illustrated schematically. Infrastructure 600 contains computer networks 602. Computer networks 602 may include many different types of computer networks available today, such as the Internet, a corporate network or a Local Area Network (LAN). Each of these networks can contain wired or wireless programmable devices and operate using any number of network protocols (e.g., TCP/IP). Networks 602 may be connected to gateways and routers (represented by 608), end user computers 606, and computer servers 604. Infrastructure 600 also includes cellular network 603 for use with mobile communication devices. Mobile cellular networks support mobile phones and many other types of mobile devices. Mobile devices in the infrastructure 600 are illustrated as mobile phones 610, laptops 612 and tablets 614. A mobile device such as mobile phone 610 may interact with one or more mobile provider networks as the mobile device moves, typically interacting with a plurality of mobile network towers 620, 630, and 640 for connecting to the cellular network 603. Although referred to as a cellular network in FIG. 6, a mobile device may interact with towers of more than one provider network, as well as with multiple non-cellular devices such as wireless access points and routers 608. In addition, the mobile devices 610, 612 and 614 may interact with non-mobile devices such as computers 604 and 606 for desired services, which may include protecting a PC device controller from BDF masquerade attacks by Ring-0 and Ring-3 malware as described above. The functionality of the server 616 or client 606 may be implemented in any device or combination of devices illustrated in FIG. 6; however, most commonly is implemented in a network system.

The following examples pertain to further embodiments.

Example 1 is a machine readable medium, on which are stored instructions, comprising instructions that when executed cause a machine to identify with a controller enumerated information from a peripheral device; perform a secure hypervisor boot to create at least one secure virtual machine and an unsecure virtual machine; disable legacy enumeration for the peripheral device responsive to performing the secure hypervisor boot; communicate the enumerated information to one or more configuration-interface tables of the secure virtual machine; disallow access to the enumerated information for the unsecure virtual machine responsive to communicating the enumerated information to the secure virtual machine; and monitor changes to the enumerated information.

In Example 2, the subject matter of Example 1 can optionally include, wherein the instructions that when executed cause the machine to identify the enumerated information further comprise instructions that when executed cause the machine to store a memory mapped address range and controller information in one or more configuration-interface tables.

In Example 3, the subject matter of Example 1 can optionally include, wherein the instructions to disallow access to the unsecure virtual machine further comprise instructions that when executed cause the machine to: allow read access for the unsecure virtual machine to the memory mapped address range; and prevent write access for the unsecure virtual machine to the memory mapped address range.

In Example 4, the subject matter of Example 1 to 3 can optionally include, wherein the instructions that when executed cause the machine to perform a secure hypervisor boot further comprise instructions that when executed cause the machine to: initialize a hypervisor; and load a first operating system in the secure virtual machine; and load a second operating system in the unsecure virtual machine.

In Example 5, the subject matter of Example 1 to 3 can optionally include, wherein the instructions further comprise instructions that when executed cause the machine to perform enumeration of the secure virtual machine.

In Example 6, the subject matter of Example 5 can optionally include, wherein the instructions to perform the enumeration of the secure virtual machine further comprise instructions that when executed cause the machine to identify memory mapped address ranges in the one or more configuration-interface tables, wherein the memory mapped address range is associated with a configuration space of the peripheral controller.

In Example 7, the subject matter of Example 1 to 3 can optionally include, wherein the instructions to disable the legacy enumeration of the peripheral device further comprise instructions that when executed cause the machine to disable read and writes to a legacy configuration address input-output port.

In Example 8, the subject matter of Example 1 to 3 can optionally include, wherein the instructions further comprise instructions that when executed cause the machine to enable communication between the secure virtual machine and the peripheral device.

In Example 9, the subject matter of Example 1 to 3 can optionally include, wherein the instructions to disallow the access for the unsecure virtual machine further comprise instructions that when executed cause the machine to provide read and write access to the memory mapped address ranges associated for the secure virtual machine using extended page tables.

In Example 10, the subject matter of Example 1 to 3 can optionally include, wherein the instructions to provide the access for the secure virtual machine further comprise instructions that when executed cause the machine to provide direct memory access by the controller to the memory mapped address ranges associated with the secure virtual machine.

Example 11 is a method for address protection, comprising: identifying with a controller enumerated information from a peripheral device; performing a secure hypervisor boot to create at least one secure virtual machine and an unsecure virtual machine; disabling legacy enumeration for the peripheral device responsive to performing the secure hypervisor boot; communicating the enumerated information to one or more configuration-interface tables of the secure virtual machine; disallowing access to the enumerated information for the unsecure virtual machine responsive to communicating the enumerated information to the secure virtual machine; and monitoring changes to the enumerated information.

In Example 12, the subject matter of Example 11 can optionally include storing memory mapped address ranges and controller information in one or more configuration and interface tables.

In Example 13, the subject matter of Example 12 can optionally include allowing read access for the unsecure virtual machine to the memory mapped address range; and preventing write access for the unsecure virtual machine to the memory mapped address range.

In Example 14, the subject matter of Example 12 to 13 can optionally include identifying the memory mapped address range in the one or more configuration-interface tables, wherein the memory mapped address range is associated with a configuration space of the peripheral controller.

In Example 15, the subject matter of Example 12 to 13 can optionally include providing access to the memory mapped address ranges associated with the secure virtual machine using extended page tables responsive to disallowing the access for the unsecure virtual machine.

In Example 16, the subject matter of Example 12 to 13 can optionally include providing direct memory access by the controller to the memory mapped address ranges associated with the secure virtual machine.

In Example 17, the subject matter of Example 12 to 13 can optionally include initializing a hypervisor; loading a first operating system in the secure virtual machine; and loading a second operating system in the unsecure virtual machine.

In Example 18, the subject matter of Example 12 to 13 can optionally include performing enumeration of the secure virtual machine.

In Example 19, the subject matter of Example 12 to 13 can optionally include disabling read and writes to a legacy configuration address input-output port responsive to disabling the legacy enumeration.

In Example 20, the subject matter of Example 12 to 13 can optionally include enabling communication between the secure virtual machine and the peripheral device.

Example 21 is a computer system for address protection, comprising: one or more processors; and a memory coupled to the one or more processors, on which are stored instructions, comprising instructions that when executed cause one or more of the processors to: identify with a controller enumerated information from a peripheral device; execute a secure hypervisor boot to create at least one secure virtual machine and an unsecure virtual machine; disable legacy enumeration for the peripheral device responsive to performing the secure hypervisor boot; communicate the enumerated information to one or more configuration-interface tables of the secure virtual machine; disallow access to the enumerated information for the unsecure virtual machine responsive to communicating the enumerated information to the secure virtual machine; and monitor changes to the enumerated information.

In Example 22, the subject matter of Example 21 can optionally include, wherein the instructions further comprise instructions that when executed cause one or more of the processors to store a memory mapped address range and controller information in one or more configuration-interface tables.

In Example 23, the subject matter of Example 22 can optionally include, wherein the instructions further comprise instructions that when executed cause one or more of the processors to: allow read access for the unsecure virtual machine to the memory mapped address range; and prevent write access for the unsecure virtual machine to the memory mapped address range.

In Example 24, the subject matter of Example 22 to 23 can optionally include, wherein the instructions further comprise instructions that when executed cause one or more of the processors to identify the memory mapped address range in the one or more configuration-interface tables, wherein the memory mapped address range is associated with a configuration space of the peripheral controller.

In Example 25, the subject matter of Example 22 to 23 can optionally include, wherein the instructions further comprise instructions that when executed cause one or more of the processors to provide access to the memory mapped address range for the secure virtual machine using extended page tables.

In Example 26, the subject matter of Example 22 to 23 can optionally include, wherein the instructions further comprise instructions that when executed cause one or more of the processors to provide direct memory access by the controller to the memory mapped address range associated with the secure virtual machine.

In Example 27, the subject matter of Example 22 to 23 can optionally include, wherein the instructions further comprise instructions that when executed cause one or more of the processors to: initialize a hypervisor; and load a first operating system in the secure virtual machine; and load a second operating system in the unsecure virtual machine.

In Example 28, the subject matter of Example 22 to 23 can optionally include, wherein the instructions further comprise instructions that when executed cause one or more of the processors to disable read and writes to a legacy configuration address input-output port.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A machine readable storage device, comprising instructions that when executed cause a machine to:
   identify with a controller enumerated information from a peripheral device;
   perform a secure hypervisor boot to create at least one secure virtual machine and an unsecure virtual machine;

disable legacy enumeration for the peripheral device responsive to performing the secure hypervisor boot;
communicate the enumerated information to one or more configuration-interface tables of the secure virtual machine;
allow access to the enumerated information for the secure virtual machine responsive to communicating the enumerated information to the secure virtual machine; and
monitor changes to the enumerated information.

2. The machine readable storage device of claim 1, wherein the instructions that cause the machine to identify the enumerated information at least cause the machine to store memory mapped address ranges and controller information in the one or more configuration-interface tables.

3. The machine readable storage device of claim 1, wherein the instructions that cause the machine to perform a secure hypervisor boot at least cause the machine to:
initialize a hypervisor; and
load a first operating system in the secure virtual machine; and
load a second operating system in the unsecure virtual machine.

4. The machine readable storage device of claim 1, wherein the instructions at least cause the machine to perform enumeration of the secure virtual machine.

5. The machine readable storage device of claim 4, wherein the instructions to perform the enumeration of the secure virtual machine at least cause the machine to identify a memory mapped address range in the one or more configuration-interface tables, wherein the memory mapped address range is associated with a configuration space of a peripheral controller.

6. The machine readable storage device of claim 1, wherein the instructions to disable the legacy enumeration of the peripheral device at least cause the machine to disable read and writes to a legacy configuration address input-output port.

7. The machine readable storage device of claim 1, wherein the instructions at least cause the machine to enable communication between the secure virtual machine and the peripheral device.

8. The machine readable storage device of claim 2, wherein the instructions to allow the access for the secure virtual machine at least cause the machine to provide access to the memory mapped address ranges associated with the secure virtual machine using extended page tables.

9. The machine readable storage device of claim 8, wherein the instructions to provide the access for the secure virtual machine at least cause the machine to provide direct memory access by the controller to the memory mapped address ranges associated with the secure virtual machine.

10. A method for address protection, comprising:
identifying with a controller enumerated information from a peripheral device;
performing a secure hypervisor boot to create at least one secure virtual machine and an unsecure virtual machine;
disabling legacy enumeration for the peripheral device responsive to performing the secure hypervisor boot;
communicating the enumerated information to one or more configuration-interface tables of the secure virtual machine;
allow access to the enumerated information for the secure virtual machine responsive to communicating the enumerated information to the secure virtual machine; and
monitoring changes to the enumerated information.

11. The method of claim 10, further including storing memory mapped address ranges and controller information in the one or more configuration-interface tables.

12. The method of claim 10, further including identifying a memory mapped address range in the one or more configuration-interface tables, wherein the memory mapped address range is associated with a configuration space of a peripheral controller.

13. The method of claim 10, further including:
initializing a hypervisor; and
loading a first operating system in the secure virtual machine; and
loading a second operating system in the unsecure virtual machine.

14. The method of claim 10, further including performing enumeration of the secure virtual machine.

15. The method of claim 10, further including disabling read and writes to a legacy configuration address input-output port responsive to disabling the legacy enumeration.

16. The method of claim 10, further including enabling communication between the secure virtual machine and the peripheral device.

17. The method of claim 11, further including providing access to the memory mapped address ranges associated with the secure virtual machine using extended page tables responsive to allowing the access for the secure virtual machine.

18. The method of claim 17, further including providing direct memory access by the controller to the memory mapped address ranges associated with the secure virtual machine.

19. A computer system for address protection, comprising:
one or more processors; and
a memory coupled to the one or more processors, the memory comprising instructions that when executed cause one or more of the processors to:
identify with a controller enumerated information from a peripheral device;
execute a secure hypervisor boot to create at least one secure virtual machine and an unsecure virtual machine;
disable legacy enumeration for the peripheral device responsive to performing the secure hypervisor boot;
communicate the enumerated information to one or more configuration-interface tables of the secure virtual machine;
allow access to the enumerated information for the secure virtual machine responsive to communicating the enumerated information to the secure virtual machine; and
monitor changes to the enumerated information.

20. The computer system of claim 19, wherein the instructions, when executed, cause the one or more of the processors to store a memory mapped address range and controller information in the one or more configuration-interface tables.

21. The computer system of claim 20, wherein the instructions, when executed, cause the one or more of the processors to identify a memory mapped address range in the one or more configuration-interface tables, wherein the memory mapped address range is associated with a configuration space of a peripheral controller.

22. The computer system of claim 21, wherein the instructions, when executed, cause the one or more of the processors to provide access to the memory mapped address range for the secure virtual machine using extended page tables.

23. The computer system of claim 21, wherein the instructions, when executed, cause the one or more of the processors to provide direct memory access by the controller to the memory mapped address range associated with the secure virtual machine.

24. The computer system of claim 19, wherein the instructions, when executed, cause the one or more of the processors to:
   initialize a hypervisor; and
   load a first operating system in the secure virtual machine; and
   load a second operating system in the unsecure virtual machine.

25. The computer system of claim 19, wherein the instructions, when executed, cause the one or more of the processors to disable read and writes to a legacy configuration address input-output port.

\* \* \* \* \*